US008886734B2

(12) United States Patent
Forstall et al.

(10) Patent No.: US 8,886,734 B2
(45) Date of Patent: Nov. 11, 2014

(54) EMAIL MAILBOX MANAGEMENT WITH SENDER-SPECIFIC MESSAGE LISTS

(75) Inventors: Scott Forstall, Mountain View, CA (US); Terry Blanchard, San Jose, CA (US); Daniel Shteremberg, San Francisco, CA (US); Angela Guzman, Sunnyvale, CA (US); Stephen Lemay, Palo Alto, CA (US); Philip Tao, Cupertino, CA (US); Chris Lindsay, San Jose, CA (US); Ashley Clark, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 13/366,231

(22) Filed: Feb. 3, 2012

(65) Prior Publication Data

US 2013/0204946 A1    Aug. 8, 2013

(51) Int. Cl.
*G06F 15/16* (2006.01)

(52) U.S. Cl.
USPC ........................................ 709/206

(58) Field of Classification Search
USPC ........................................ 709/206
See application file for complete search history.

(56) References Cited

U.S. PATENT DOCUMENTS

| | | | |
|---|---|---|---|
| 6,057,841 A | 5/2000 | Thurlow et al. | |
| 6,574,658 B1 * | 6/2003 | Gabber et al. ............... | 709/206 |
| 6,708,205 B2 | 3/2004 | Sheldon et al. | |
| 6,847,989 B1 | 1/2005 | Chastain et al. | |
| 6,871,217 B2 | 3/2005 | Voticky et al. | |
| 7,290,033 B1 | 10/2007 | Goldman et al. | |
| 2005/0091272 A1 | 4/2005 | Smith et al. | |
| 2005/0267944 A1 | 12/2005 | Little, II | |
| 2006/0083192 A1 * | 4/2006 | Dinescu et al. ............... | 370/328 |
| 2006/0206713 A1 * | 9/2006 | Hickman et al. ............. | 713/176 |
| 2006/0276208 A1 * | 12/2006 | Jain ............................... | 455/466 |
| 2007/0022168 A1 * | 1/2007 | Suzuki ......................... | 709/206 |
| 2007/0294353 A1 * | 12/2007 | Marks et al. ................. | 709/206 |
| 2008/0086646 A1 * | 4/2008 | Pizano ......................... | 713/189 |
| 2008/0092217 A1 * | 4/2008 | Nagami et al. .............. | 726/5 |
| 2008/0306972 A1 | 12/2008 | Wilkin et al. | |
| 2009/0182830 A1 * | 7/2009 | Goldman et al. ............ | 709/206 |
| 2010/0293475 A1 | 11/2010 | Nottingham et al. | |
| 2010/0299394 A1 | 11/2010 | Jania et al. | |
| 2011/0153752 A1 * | 6/2011 | Seaman ....................... | 709/206 |

OTHER PUBLICATIONS

Gmail for Android: better Priority Inbox support and improved compose, Official Gmail Blog: News, tips, and tricks from Google's Gmail team and friends, posed by Paul Westbrook, http://gmailblog.blogspot.com/2010/12/gmail-for-android-better-priority-inbox.html, Dec. 9, 2010, 3 pages.
Priority Inbox—Google Mobile Help, downloaded from the internet on Jan. 19, 2012 at: http://support.google.com/mobile/bin/answer.py?hl=en&answer=168622, 2 pages.

(Continued)

*Primary Examiner* — Jeong S Park
(74) *Attorney, Agent, or Firm* — Kilpatrick Townsend & Stockton LLP (57) ABSTRACT

Exemplary methods, apparatuses, and systems receive an instruction to establish a rule to take an action on each email message received from a first email address, determine that the first email address is associated with contact data, determine that the contact data is associated with a second email address, and apply the rule to take the action on each email message received from the second email address.

21 Claims, 8 Drawing Sheets

(56) References Cited

OTHER PUBLICATIONS

How Importance Ranking Works—Gmail Help, downloaded from the internet on Jan. 19, 2012 at: https://support.google.com/mail/bin/answer.py?hl=en&answer=186543, 1 page.

International Search Report and Written Opinion mailed Apr. 26, 2013 in PCT/US2013/023605, 7 pages.
European Search Report mailed May 3, 2013 in EP13153548.6, 6 pages.

* cited by examiner

| Cloud Rules 705 | | Local Rules 710 | |
|---|---|---|---|
| 725 | • UID: 100<br>Name: Martin McFly<br>Email Addresses:<br>mcfly@me.com<br>mmcfly@gmail.com | 720 | • UID: 100<br>Name: Marty McFly<br>Email Addresses:<br>mcfly@me.com<br>marty@apple.com |
| 750 | • UID: 250<br>Name: Biff Tannen<br>Email Addresses:<br>biff@yahoo.com<br>bifftannen@aol.com | 735 | • UID: 110<br>Name: Emmett Brown<br>Email Addresses:<br>docbrown@me.com<br>ebrown@gmail.com |
| 765 | • UID: 300<br>Name: George McFly<br>Email Addresses:<br>gmcfly@me.com | 745 | • UID: 120<br>Name: Biff Tannen<br>Email Addresses:<br>biff@yahoo.com<br>btannen@hotmail.com |
| 770 | • UID: 400<br>Name: McFlys<br>Email Addresses:<br>mcflyfamily@me.com | 760 | • UID: 130<br>Name: George McFly<br>Email Addresses:<br>gmcfly@me.com<br>mcflyfamily@me.com |

| Common Updated Rules 715 | | | |
|---|---|---|---|
| 730 | • UID: 100<br>Name: Martin McFly<br>Email Addresses:<br>mcfly@me.com<br>mmcfly@gmail.com<br>marty@apple.com | 775 | • UID: 300<br>Name: George McFly<br>Email Addresses:<br>gmcfly@me.com<br>mcflyfamily@me.com |
| 740 | • UID: 110<br>Name: Emmett Brown<br>Email Addresses:<br>docbrown@me.com<br>ebrown@gmail.com | 780 | • UID: 400<br>Name: McFlys<br>Email Addresses:<br>mcflyfamily@me.com |
| 755 | • UID: 250<br>Name: Biff Tannen<br>Email Addresses:<br>biff@yahoo.com<br>bifftannen@aol.com<br>btannen@hotmail.com | | |

EMAIL MAILBOX MANAGEMENT WITH SENDER-SPECIFIC MESSAGE LISTS

FIELD

The various embodiments described herein relate to apparatuses, systems, and methods to manage an email mailbox. In particular, the embodiments relate to the management of rules applied to received email messages.

COPYRIGHT NOTICE/PERMISSION

A portion of the disclosure of this patent document contains material this is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2012, Apple Inc., All Rights Reserved.

BACKGROUND

Email systems are able to sort email messages based upon various rules. For example, a user may establish a rule to sort email messages sent by a particular sender email address into a separate mailbox. The user would initiate the rule creation and interact with a graphical user interface (e.g., dialog box) to enter the sender email address and select or enter that the rule is to apply to messages received from the sender email address. The creation of such a rule involves multiple inputs from the user to create, modify, and confirm the rule. Thereafter, the user can select the separate mailbox to view email messages that originated from that sender email address. The rule created in this example, however, is based only upon the specified sender email address. Should the sender have an additional or new email address, the email system will not sort email messages from the additional or new email address into the separate mailbox.

SUMMARY OF THE DESCRIPTION

Exemplary methods, apparatuses, and systems receive an instruction to establish a rule to take an action on each email message received from a first email address, determine that the first email address is associated with contact data, determine that the contact data is associated with a second email address, and apply the rule to take the action on each email message received from the second email address. In one embodiment, an instruction edit the contact data to add the second email address to the contact data or to replace the first email address with the second email address causes the automatic application of the rule to each email message received from the second email address. For yet another embodiment, the rule is transmitted to another computer to be applied to each email message received by that computer from the second email address.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
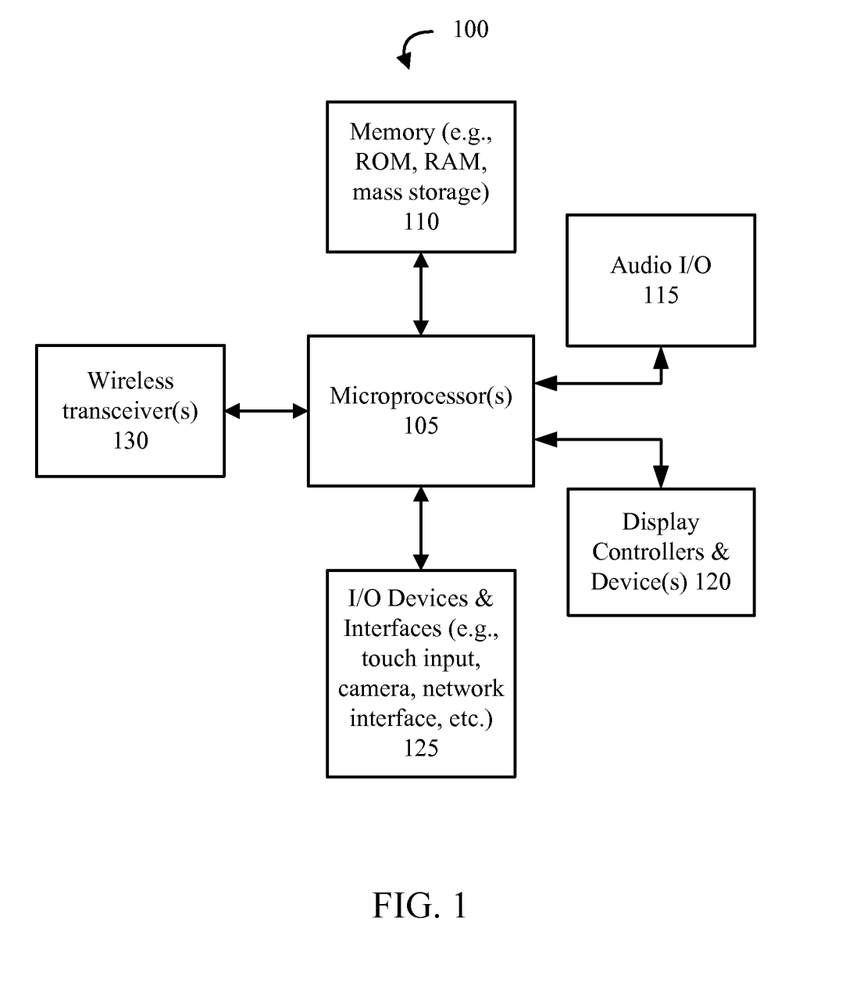
FIG. 1 illustrates, in block diagram form, an exemplary processing system that can manage rules applied to received email messages.

FIG. 1 illustrates, in block diagram form, an exemplary data processing system 100 that can manage rules applied to received email messages, as described herein. Data processing system 100 may include one or more microprocessors 105 and connected system components (e.g., multiple connected chips) or the data processing system 100 may be a system on a chip.

The data processing system 100 includes memory 110 which is coupled to the microprocessor(s) 105. The memory 110 may be used for storing data, metadata, and programs for execution by the microprocessor(s) 105. The memory 110 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

The data processing system 100 also includes an audio input/output subsystem 115 which may include a microphone and/or a speaker for, for example, playing back music, providing telephone or voice/video chat functionality through the speaker and microphone, receiving voice instructions to be executed by the microprocessor(s) 105, playing audio notifications, etc.

A display controller and display device 120 provides a visual user interface for the user; this user interface may include a graphical user interface which, for example, is similar to that shown on a Macintosh computer when running Mac OS operating system software or an iPad, iPhone, or similar device when running iOS operating system software.

Data processing system 100 also includes one or more wireless transceivers 130, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network.

It will be appreciated that one or more buses, may be used to interconnect the various components shown in FIG. 1.

The data processing system 100 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing system 100 may be a network computer or an embedded processing device within another device or consumer electronic product. As used herein, the terms "computer" and "apparatus comprising a processing device" may be used interchangeably with the data processing system 100 and include the above-listed exemplary embodiments.

The system 100 also includes one or more input or output ("I/O") devices and interfaces 125 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 100. The I/O devices and interfaces 125 may also include a connector for a dock or a connector for a USB interface, FireWire, Thunderbolt, Ethernet, etc. to connect the system 100 with another device, external component, or a network.

It will be appreciated that additional components, not shown, may also be part of the system 100, and, in certain embodiments, fewer components than that shown in FIG. 1 may also be used in a data processing system 100. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 110 or other machine-readable storage medium. The software may further be transmitted or received over a network (not shown) via a network interface device 125. In various embodiments, hardwired circuitry may be used in combination with the software instructions to implement the present embodiments. Thus, the techniques are not limited to any specific combination of hardware circuitry and software, or to any particular source for the instructions executed by the data processing system 100.

Figure 2:
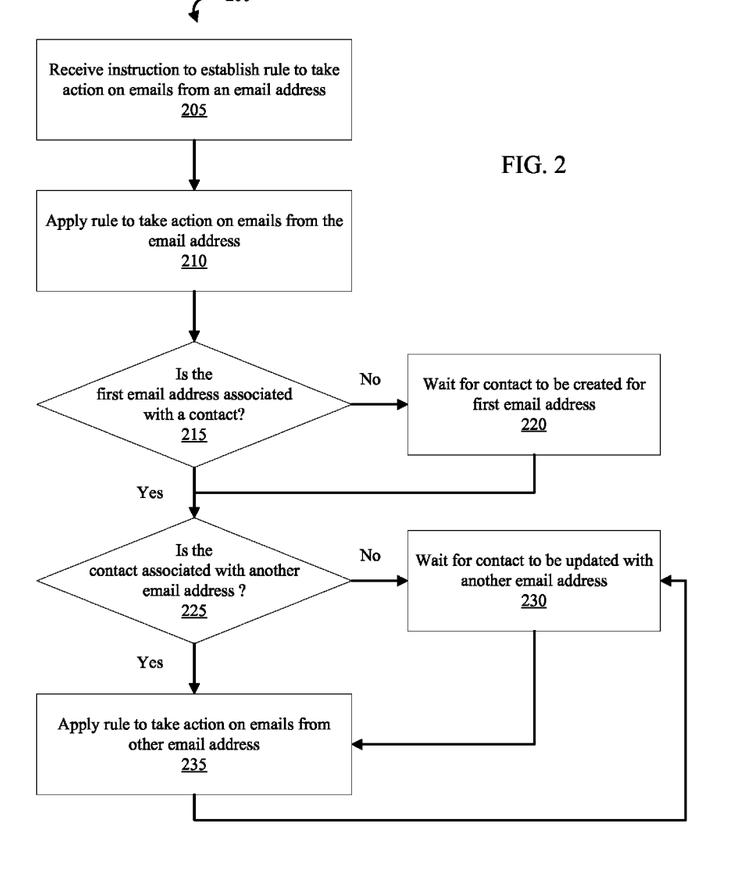
FIG. 2 is a flow chart that illustrates an exemplary method of managing rules applied to received email messages.

FIG. 2 is a flow chart that illustrates an exemplary method 200 of managing rules applied to received email messages. At block 205, the data processing system 100 receives an instruction to establish a rule to take an action on emails from an email address. Exemplary rules include sorting email messages from the email address into a particular inbox or folder (with or without excluding the email messages from the primary mailbox), filtering email messages within a particular mailbox or folder (e.g., to display or not display those email messages), providing a visual and/or audio notification that an email message has been received from the email address, sending a text message to a mobile device, automatically forwarding email messages from the email address, generating automatic reply email messages to email messages from the email address, etc. A rule may be established in response to input received from a user of the data processing system 100, e.g., via a email user interface.

Figure 3:
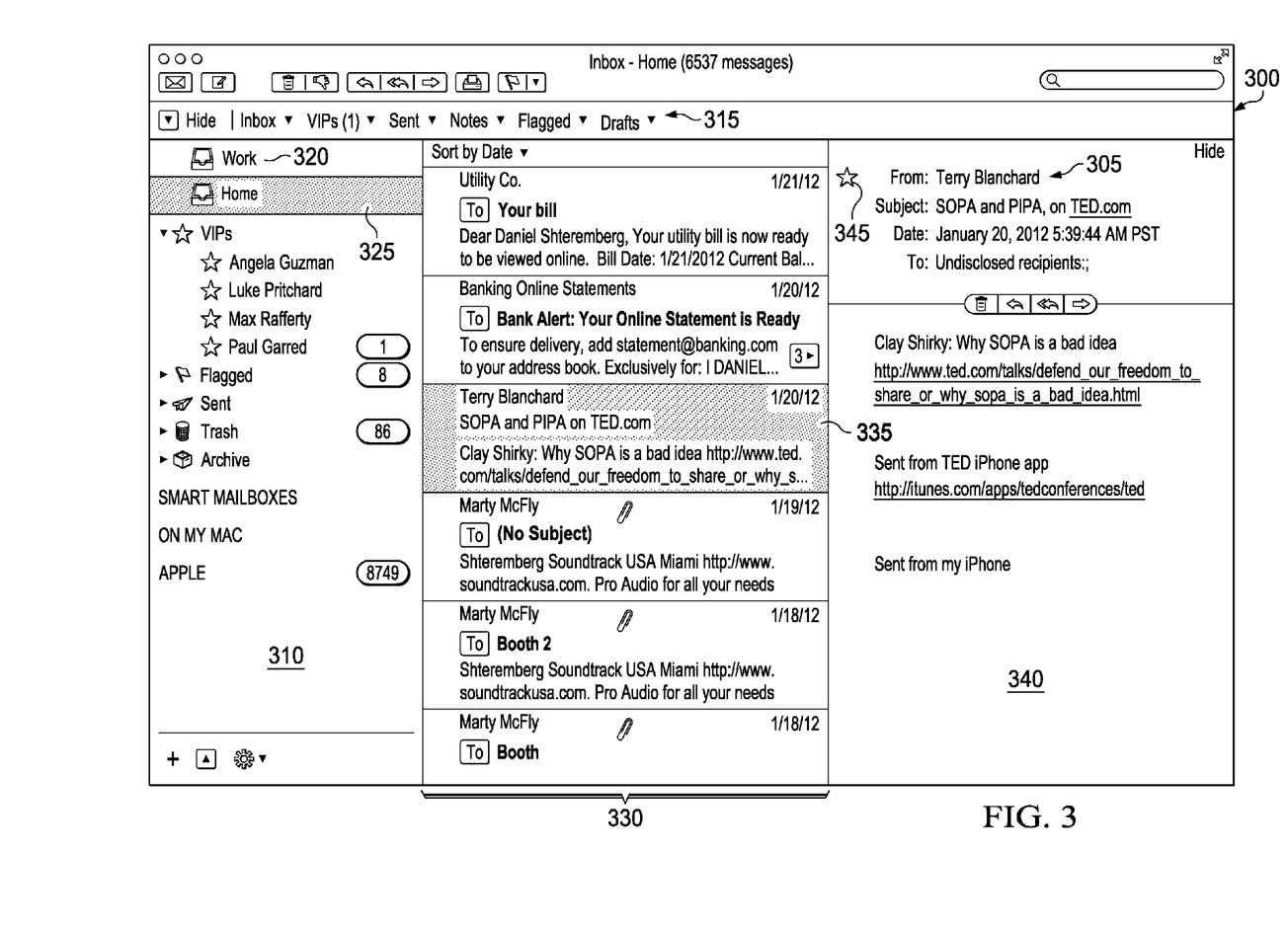
FIG. 3 illustrates an exemplary user interface prior to establishing a rule to take an action on each email message received from a first email address.

FIG. 3 illustrates an exemplary email user interface 300 prior to establishing a rule to take an action on each email message received from a first email address for a particular sender 305. The exemplary email user interface 300 includes one or more mailboxes or folders. The one or more mailboxes or folders may be displayed as selectable objects in a pane 310 or menu bar 315. In FIG. 3, two primary mailboxes are displayed, Work 320 and Home 325. Each primary mailbox may receive email from separate email accounts, e.g., a work email account and a home or personal email account. Secondary mailboxes or folders associated with particular rules may be similarly displayed and will be described further below. As used herein, a "primary mailbox" refers to an inbox or mailbox that receives all email messages associated with a particular email account and a "secondary mailbox" refers to a mailbox that receives or displays a subset of email messages received associated with a particular email account (e.g., email messages sorted based upon a particular sender).

In the exemplary user interface 300 shown in FIG. 3, the Home mailbox 325 is currently selected, as shown by the highlighted bar on the Home mailbox 325 in the mailbox pane 310. In one embodiment, a list of received emails for the selected Home mailbox 325 is displayed in a email message preview pane 330. A particular email message 335 from the sender 305 has been selected, as demonstrated by the highlighting of the email message 335 in the preview pane 330 and the displaying of the actual message 340.

In one embodiment, the instruction to establish the rule only includes a single user input, such as the user selection of an interface object 345 displayed on the displayed email message 340. In response to the single user input, the data processing system 100 will apply the rule to email messages received from the sender 305—e.g., create a separate mailbox or folder in which all email messages from the sender 305 may be viewed. In one embodiment, the user interface object 345 may change appearance, e.g., be filled or change color, to demonstrate when selected. Interface object 345, as illustrated in FIG. 3, is an empty star-shaped object. The interface object 345, however, can be presented in various forms that would enable the user to cause the data processing system 100, in a single action, to establish the rule with regard to email messages received from the sender 305. Other exemplary forms for the user interface object 345 may include, for example, flags, labels, boxes, switches, etc. that may be toggled, change shape, change color, or otherwise indicate a change between unselected and selected states.

Alternatively or additionally to establishing a rule by way of a single user input as described above, a user may establish the rule by selecting it from a drop down menu (e.g., in menu bar 315) or by performing a cursor control input (e.g., a click, a control-click, right-click, a touch input, etc.) on the mailbox pane 310, on the message 335 in the preview pane 330, or on the sender's name 305 in the message 340. For example, a user may perform a cursor control input on the sender's name 305 in the message 340 to open contact data (as described below with reference to FIG. 5) for the sender. The user may then select a user interface object included along with the contact data to create rule for all email addresses included in the contact data.

Returning to FIG. 2, at block 210, the data processing system 100 applies the rule to take an action on emails received from the sender 305. For example, when the rule is to sort email messages from the sender 305 into a particular inbox or folder, the data processing system creates a mailbox or folder for the sender 305 that includes email messages sent by the sender 305 from the email address used to send the email message 340. In one embodiment, the data processing system 100 applies the rule to previously received email messages from the sender 305 as well as new messages from the sender 305, as they are received. Alternatively, the data processing system 100 applies the rule only to new messages from the sender 305, as they are received, by default and requires further action to apply the rule to previously received email messages from the sender 305.

Figure 4:
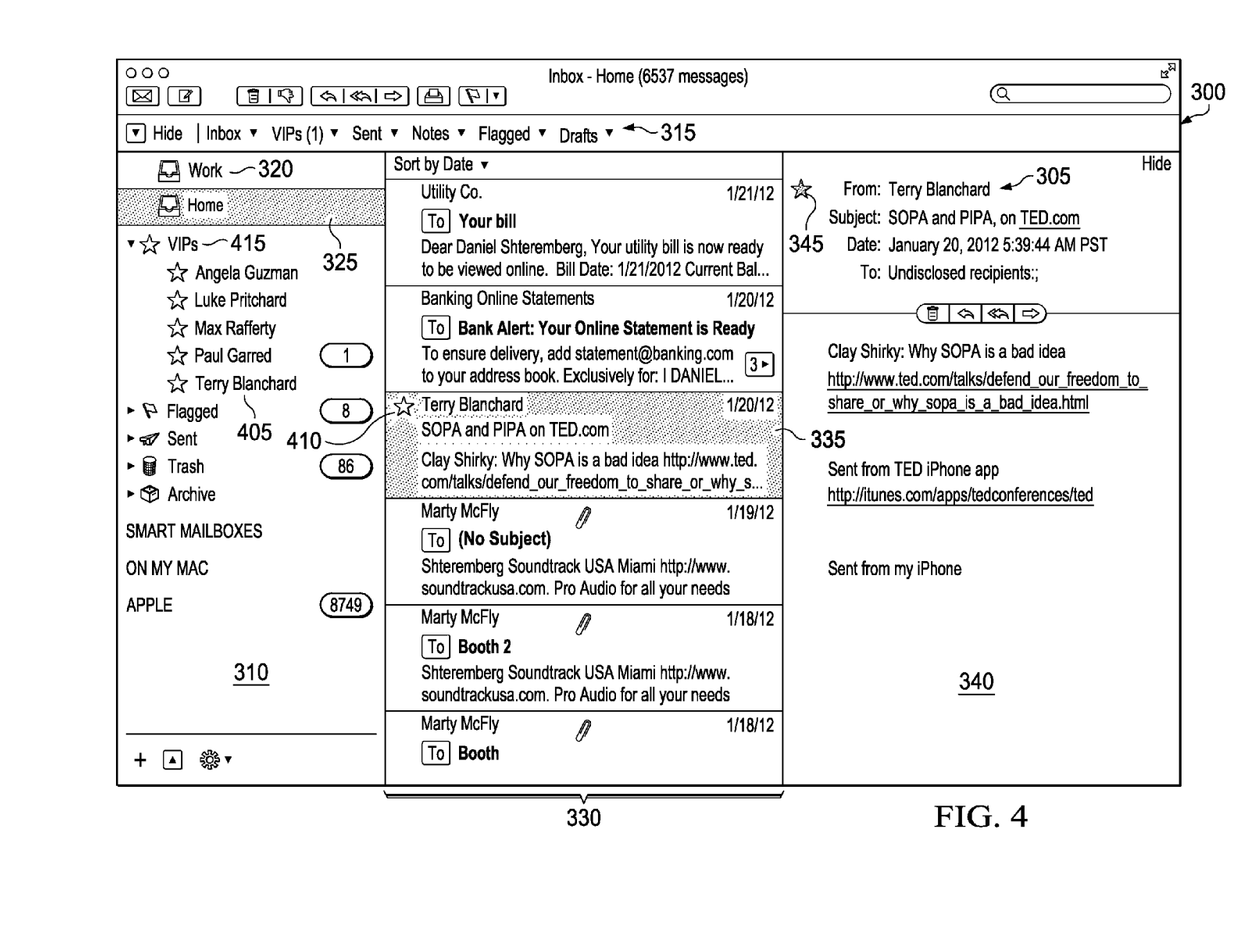
FIG. 4 illustrates an exemplary user interface after establishing a rule to take an action on each email message received from a first email address.

FIG. 4 illustrates the exemplary user interface 300 after establishing a rule to take an action on each email message received from the sender 305. Following the example described above with reference to FIG. 3, the user interface object 345 has been selected. In one embodiment, selection of the user interface object 345 results in a change of the appearance of the user interface object 345. For example, as shown in FIG. 4, the star-shaped user interface object 345 is now shaded or otherwise filled with a color. As described above, in response to the instruction to establish the rule, the data processing system 100 will apply the rule to email messages received from the sender 305—e.g., create a separate mailbox 405 in which all email messages from the sender 305 may be viewed.

In one embodiment, the user interface 400 includes an indication 410 of the established rule on each email message from the sender 305 displayed in the preview pane 330. The inclusion of an indication 410 in the preview pane 330 enables a user to quickly locate email messages from the sender 305 (or other select senders) among other received messages in an inbox. For example, when the rule includes sorting messages received from the sender 305 into a separate mailbox 405, those messages may still be displayed in a primary mailbox, such as the Home mailbox 325. The indication 410 may be a similar to the selectable interface object 345 to provide a consistent visual representation of the established rule. For example, in FIG. 4, the indication 410 is a star-shaped object similar to the star-shaped selectable interface object 345.

In one embodiment, the separate mailbox 405 is sub-mailbox of a set of separate mailboxes 415 with similarly created rules for other email addresses or senders. A user may select the entire set of separate mailboxes 415 to see emails from all of the sub-mailboxes, such as mailbox 405, or select an individual sub-mailbox. In an alternate embodiment, each rule adds to a single mailbox 415 and separate mailboxes, such as mailbox 405, cannot be individually viewed.

Returning to FIG. 2, at block 215, the data processing system 100 determines if the email address from the message 340 from the sender 305 is associated with contact data. For example, the data processing system 100 may access contact data stored within the email program or in a separate address book or contacts application. At block 220, if the email address is not associated with a contact, the data processing system 100 continues to apply the rule to emails received from the sender 305 (from the email address associated with the email message 340) until receiving an instruction to delete or otherwise modify the rule or until a contact is created for the sender 305.

At block 225, if the email address for the sender 305 is associated with a contact, the data processing system 100 determines if the contact includes or is otherwise associated with one or more additional email addresses. If the contact data only includes or is only associated with the email address from which the email message 340 was received, the data processing system 100 continues to apply the rule to emails received from the sender 305 (from the email address associated with the email message 340) until receiving an instruction to delete or otherwise modify the rule or until the contact data is edited to add or replace the existing email address with a second email address. At block 235, if the contact is associated with another email address, the data processing system 100 applies the rule to email messages that were/are received from the other email address.

Figure 5:
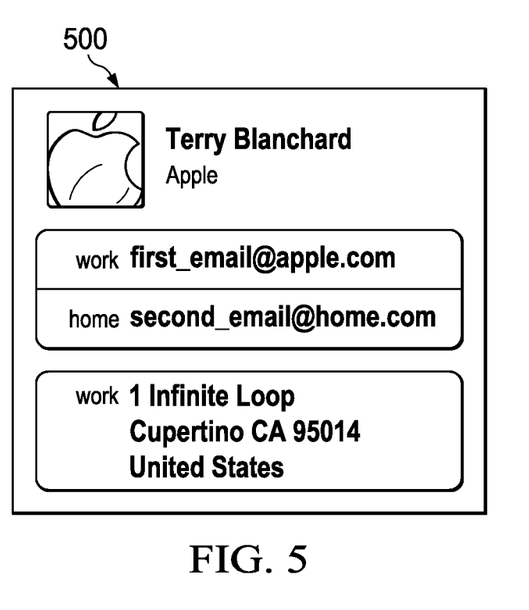
FIG. 5 illustrates an exemplary user interface displaying contact data including first and second email addresses.

FIG. 5 illustrates an exemplary user interface displaying contact data 500 including first and second email addresses for the sender 305. Following the example described above, the email message 340 received from the sender 305 may be sent from the sender's work email address first_email@apple.com. The data processing system 100 determines that the first_email@apple.com is stored or otherwise associated with a contact 500. Additionally, the data processing system 100 determines that the contact 500 includes a second email address for the sender. In the illustrated example, this second email address is the home email address second_email@home.com for the sender 305.

Continuing with the example described above, as a result of the user selection of the interface object 345 displayed on an email message 340 received from the first email address first_email@apple.com, the rule of sorting emails received from the sender 305 may applied to messages received from the second email address second_email@home.com without the email message 340 including the second email address and without the user explicitly providing the data processing system 100 with the second email address second_email@home.com when the rule is created or directly modified by the user. Additionally, should the user create or modify the contact 500 to include an additional email address after a rule is created, the data processing system 100 will, in response, automatically update the rule to include the additional email address in the new or modified contact 500.

For example, a user may create or modify a contact 500 in an address book application running on the data processing system 100. The address book application automatically sends a local notification to an email program also installed on the data processing system 100 to alert the email program of the created or updated contact 500. The email program (e.g., if running or the next time it is run) validates a set of rules for email addresses and, if the new or modified contact 500 includes or included an email address associated with a rule, the rule is updated accordingly. In the example above, a rule was created for the email messages received from the email addresses first_email@apple.com and second_email@home.com. If the contact 500 was updated add a third email address, a notification is automatically generated in response to the update. The data processing system 100 (e.g., via the email program) would determine that a rule is in place for email addresses associated with that contact 500 and automatically add the third email address. A similar process would occur if the third email address replaced one of the first two email addresses (rather than the third email address simply being added) or if one of the first two email addresses was deleted.

In one embodiment, as described above, the user may select a user interface object displayed with the contact 500 to create a rule using the email addresses first_email@apple.com and second_email@home.com.

Figure 6:
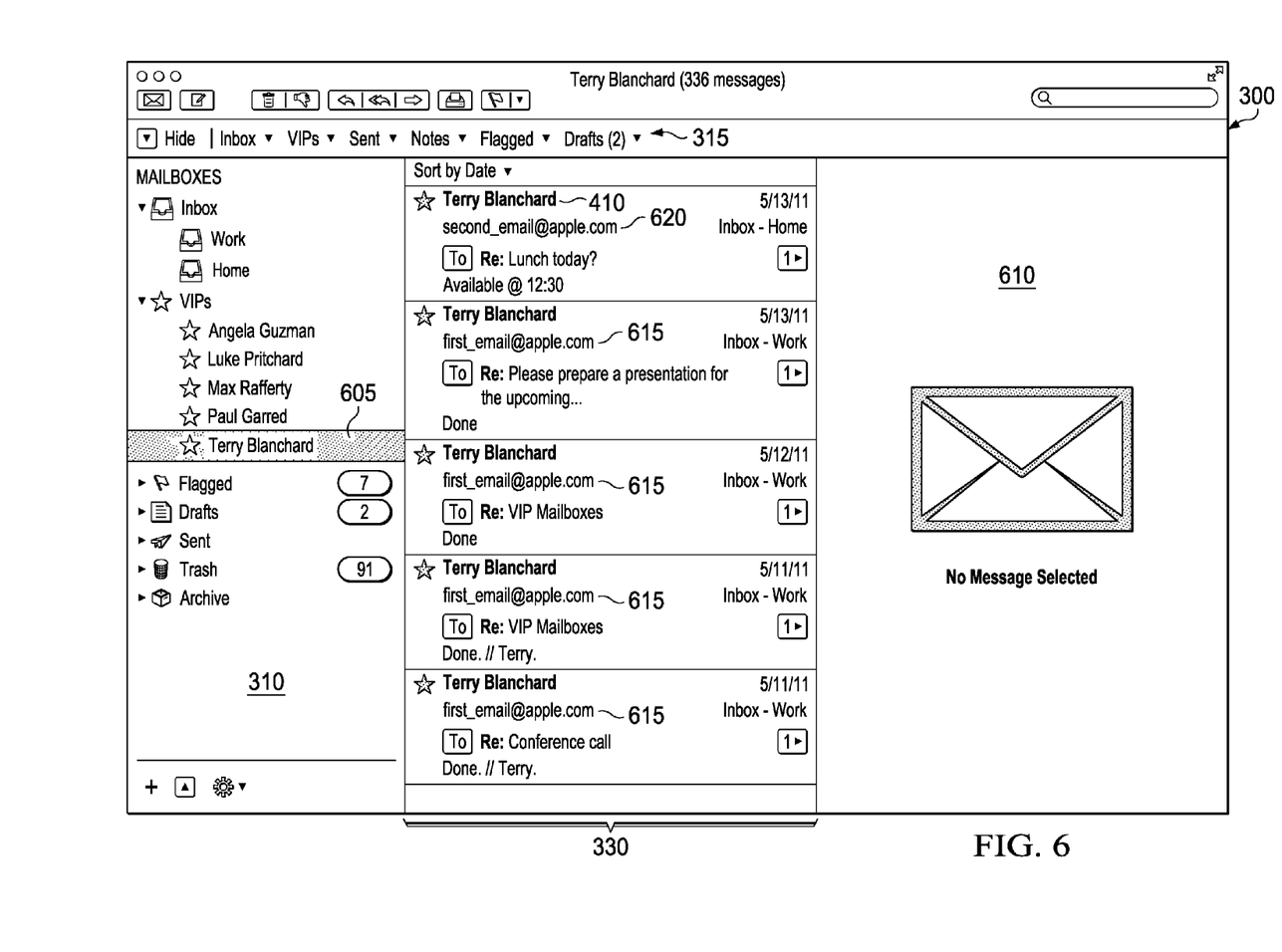
FIG. 6 illustrates an exemplary user interface displaying a secondary mailbox including emails received from the first and second email addresses.

FIG. 6 illustrates an exemplary user interface 300 displaying a secondary mailbox 605 including emails received from the first email address 615 and second email addresses 620. In the illustrated example, because the secondary mailbox 605 (e.g., that resulted from the creation of the rule described above) is selected in the mailbox pane 310, the preview pane 330 displays only email messages received from the sender 330. In one embodiment, the email messages displayed in the preview pane 330 include an indication 410 of the applied rule. Alternatively, the indication 410 is omitted when the secondary mailbox 605 is selected. Similarly, in one embodiment, if a message were selected and displayed in the email message pane 610, the message may include the user interface object 345 with an appearance to illustrate the application of the rule to that email message (e.g., a colored star rather than an empty/non-colored star). Alternatively, the user interface object 345 may be omitted when the secondary mailbox 605 is selected.

In one embodiment, the email addresses (e.g., the first and second email addresses 615 and 620) are displayed in the preview pane 330 or in a message shown in the email message pane 610. Alternatively, the email addresses are hidden and only a sender's name is shown.

While the examples above have been described above with reference to sorting emails received from a sender 305 into a separate mailbox, the use of contact data to apply other rules to a second email address may be equally applied. For example, a rule created to generate a particular notification for the receipt of an email received from the sender 305 based upon a first email address may be automatically applied by the data processing system 100 to email received from the sender 305 and sent using a second email address.

In one embodiment, the data processing system 100 optionally transmits the rule to a second computer, e.g., via a network interface 125 or wireless transceiver 130. In one embodiment, the transmission of the rule to a second computer includes the data processing system 100 uploading the rule to a server computer (server) and the second computer receiving the rule from the server as a result of the data processing system 100 and second computer having a common registration with the server. Likewise, the data processing system 100 may download a rule created on the second computer. Additionally, updates to contact data 500 associated with the sender 305, such as the addition of email address, on either the data processing system 100 or on the second computer, may result on the modification of the rule on both devices. Such a modification of the contact data 500 would result in either device transmitting the updated contact data 500 and/or the updated rule to the other device. For example, the data processing system 100 and the second computer may both be registered with a service such as iCloud (Apple, Inc. of Cupertino, Calif.) in order to share a common set of contacts and/or email rules.

Figure 7:
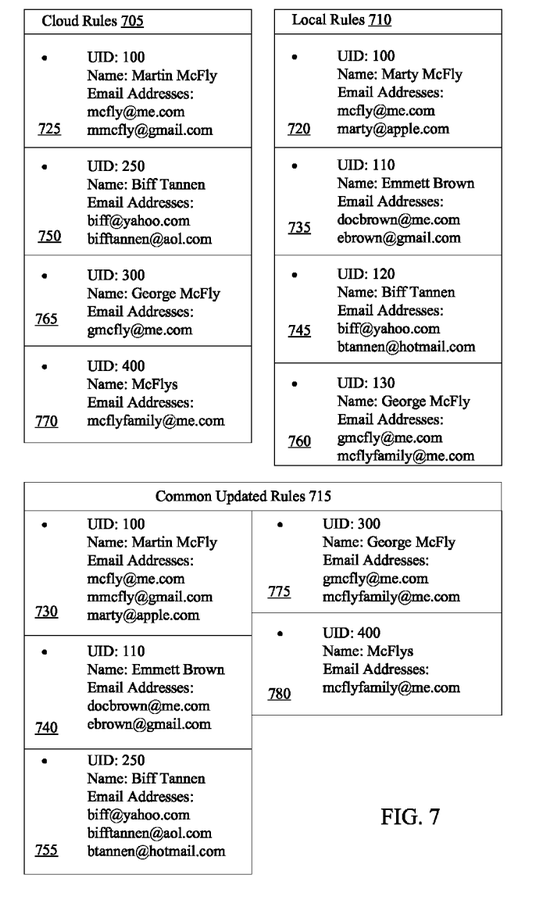
FIG. 7 illustrates exemplary rules stored on one or more devices.

FIG. 7 illustrates exemplary rules stored by a server, rules stored by the local data processing system 100, and an updated common list of rules. The local data processing system 100 downloads a list of rules from the server (cloud rules 705) and attempts to merge the cloud rules with the rules stored locally on the data processing system (local rules 710) to create an updated common list of rules (common rules 715). Each rule may include a unique identifier (UID), contact name, and one or more email addresses, which may be used in the implementation and synchronization of rules.

Figure 8:
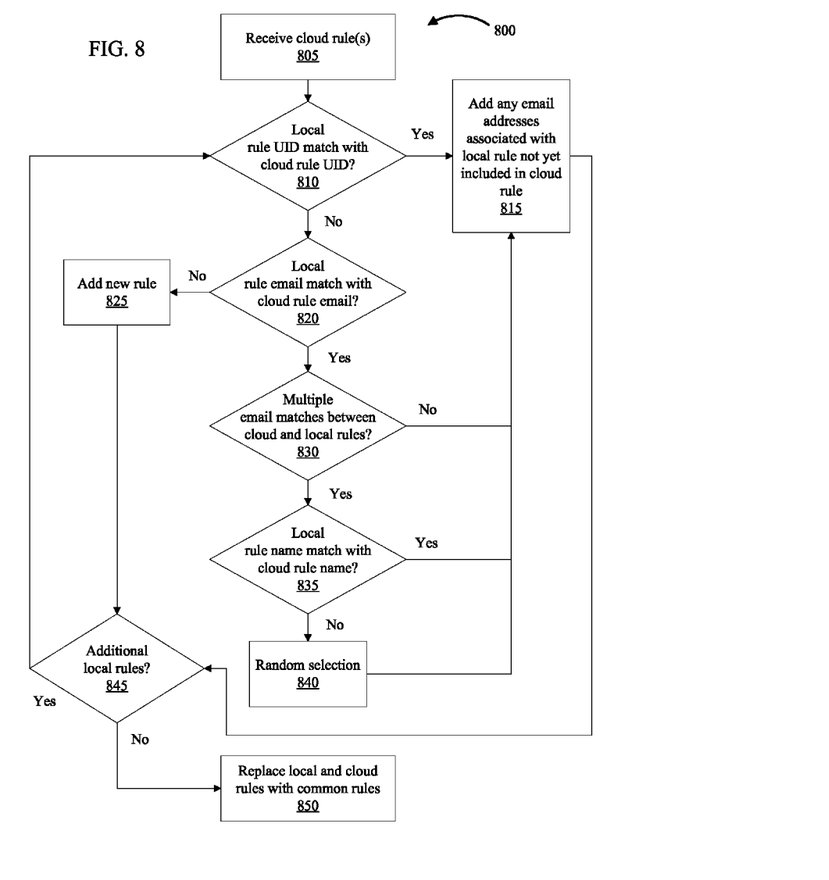
FIG. 8 is a flow chart that illustrates an exemplary method of synchronizing rules between multiple devices.

FIG. 8 is an exemplary flow chart to demonstrate synchronizations that, e.g., update the cloud rule(s) 705 as a result of a rule added to the local rule(s) 710, update the local rule(s) 710 as a result of a rule added to the cloud rule(s) 705 (e.g., by a second computer), and updates to the cloud rule(s) 705 and the local rule(s) 710 as a result of both sets of rules including a rule with at least one similar email address and at least one different email address. At block 805, the data processing system 100 receives a copy of the cloud rule(s) 705 from the server. At block 810, the data processing system 100 selects a local rule and determines if a local rule UID matches any cloud rule UID. If the local rule UID matches a cloud rule UID, at block 815, the data processing system 100 adds any email addresses included in the local rule not yet included in the cloud rule.

For example, local rule 720 for Marty McFly and cloud rule 725 for Martin McFly both include UID 100. The local rule 720 for Marty McFly and cloud rule 725 for Martin McFly also both include the email address mcfly@me.com. The cloud rule 725 for Martin McFly, however, does not include the email address marty@apple.com included in the local rule 720 for Marty McFly. As a result, the cloud rule 725 for Martin McFly is updated to include the email address marty@apple.com as illustrated by common updated rule 730 for Martin McFly. If all email addresses included in the local rule 720 for Marty McFly were already included in the cloud rule 720 for Martin McFly, the common updated rule for Martin McFly would be the same as the cloud rule 720 for Martin McFly. In an alternate embodiment, the local rule 720 for Marty McFly could be updated (e.g., to include mmcfly@gmail.com from cloud rule 725 for Martin McFly) to create a common updated rule. Additionally, while the exemplary common updated rule 730 utilizes the name Martin McFly from the cloud rules 705, an alternate embodiment could utilize the name included in the local rules 710 (e.g., Marty McFly).

At block 820, if the local rule UID does not match any cloud rule UID, the data processing system 100 determines if any email address included in the local rule matches any email addresses associated with the cloud rule(s) 705. If there are no matching email addresses, at block 825, the local rule is added to the cloud rule(s) 705.

For example, a new rule 735 for Emmett Brown is created on the data processing system 100 and added to the local rules 710. The new rule 735 includes the UID 110, which does not match any cloud rule UID. The two email addresses docbrown@me.com and ebrown@gmail.com do not match any cloud rule email addresses. The data processing system 100 adds the local rule 735 to the cloud rule(s) 705 to create the common updated rule 740 for Emmett Brown.

At block 830, if an email address included in the local rule matches a cloud rule email address, the data processing system 100 determines if an email address included in the local rule matches another cloud rule email address. If there is only one cloud rule that matches one or more email addresses included in the local rule, at block 815, the data processing system 100 adds any email addresses included in the local rule not yet included in the cloud rule.

For example the local rule 745 for Biff Tannen and the cloud rule 750 for Biff Tannen do not have matching UID's but do both include the email address biff@yahoo.com. Additionally, the email addresses biff@yahoo.com and btannen@hotmail.com from the local rule 745 for Biff Tannen do not match any other email address included in other cloud rules. The cloud rule 750 for Biff Tannen does not include the email address btannen@hotmail.com from the local rule 745 for Biff Tannen. As a result, the cloud rule 750 for Biff Tannen is updated to include the email address btannen@hotmail.com as illustrated by the common updated rule 755 for Biff Tannen.

If multiple cloud rules include an email address that matches an email address from the local rule, at block 835, the data processing system 100 determines if any of the matching cloud rules also include a name that matches the local rule. If one of the cloud rules includes both a matching email address and a matching name, at block 815, the data processing system 100 adds any email addresses included in the local rule not yet included in the cloud rule. Otherwise, at block 840, the data processing system 100 randomly selects one of the matching cloud rules and, at block 815, adds any email addresses included in the local rule not yet included in the selected cloud rule.

For example, the UID included in local rule 760 for George McFly does not match any UID in the cloud rules 705. The local rule 760 includes the email addresses gmcfly@me.com, which matches an email address in the cloud rule 765 for George McFly, and mcflyfamily@me.com, which matches an email address in the cloud rule 770 for McFlys. With multiple cloud rule email address matches, the data processing system 100 determines that the cloud rule 765 includes the matching name, George McFly, to the name for local rule 760. Additionally, the local rule 760 for George McFly includes the email address mcflyfamily@me.com, which is not included in the cloud rule 765 for George McFly. As a result, the cloud rule 765 for George McFly is updated to include the email address mcflyfamily@me.com, as illustrated by the common updated rule 775 for George McFly. The cloud rule 770 for McFlys is not matched and remains unchanged as illustrated by the common updated rule 780 for McFlys.

After adding any email addresses not yet included in a cloud rule at block 815 or adding a new rule at block 825, the data processing system 100 determines if there is another local rule to synchronize with the cloud rule(s) 705. If there is another local rule to synchronize, the process begins again at block 810. Otherwise, at block 850, the data processing system 100 replaces the local rule(s) 710 with the updated common rule(s) 715. Additionally, the data processing system 100 transmits the updated common rule(s) 715 to the server to replace the cloud rule(s) 705.

While the synchronization described above was described in terms of updating a copy of the cloud rule(s) 705 with data from the local rule(s) 710 to create common updated rule(s) 715, one embodiment may include updating a copy of the local rule(s) 710 with data from the cloud rule(s) 705 to create the common updated rule(s) 715. Additionally, features of the process 800 may be implemented separately from one another, in a different order, with less steps, with more steps, etc. Furthermore, the synchronization may include the synchronization of contact data (additionally or alternatively to the synchronization of rules) in a similar manner to the process 800 described above. The receipt of new or updated contact data via synchronization may trigger, as described above with reference to FIG. 5, the data processing system 100 to create or update a rule.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method of managing an email mailbox, the method comprising:
   presenting, by a computer, a user interface image including an email received from a first email address and a rule-creation interface object displayed with the email;
   receiving, by the computer, an instruction to establish a rule to take an action on each email message received from a first email address, wherein receiving the instruction includes receiving a single user input indicating that the user has selected the rule-creation interface object;
   determining, by the computer, that the first email address is associated with contact data;
   determining, by the computer, that the contact data is associated with a sender name and a second email address;
   applying, by the computer, the rule to take the action on each of a plurality of email messages, the plurality of email messages including at least one email message received from the first email address and at least one email message received from the second email address, wherein applying the rule to an email message includes adding the email message to a listing of email messages sent from the sender name; and
   presenting, by the computer, a user interface control that incorporates the sender name, the user interface control being operable to instruct the computer to present the listing of email messages sent from the sender name.

2. The computer-implemented method of claim 1, wherein the second email address was associated with the contact data prior to the computer receiving the instruction to establish the rule.

3. The computer-implemented method of claim 1, wherein the second email address becomes associated with the contact data after the computer received the instruction to establish the rule.

4. The computer-implemented method of claim 3, further comprising:
   receiving, by the computer, an instruction to edit the contact data to add the second email address to the contact data or to replace the first email address with the second email address, wherein receiving the instruction to edit the contact data causes the computer to automatically apply the rule to each email message received from the second email address.

5. The computer-implemented method of claim 1, wherein applying the rule further includes sorting email messages received from the first email address into a mailbox other than a primary mailbox.

6. The computer-implemented method of claim 1, wherein applying the rule further includes generating a notification of receipt of a new email message from the first email address or the second email address the new email message being received subsequently to establishing the rule.

7. The computer-implemented method of claim 6, wherein generation of a notification of the receipt of an email message occurs for only a subset of all email messages received by the computer.

8. The computer-implemented method of claim 1, further comprising:
   transmitting the rule to a second computer, the second computer to apply the rule to each email message received from the second email address.

9. The computer-implemented method of claim 8, wherein the transmitting the rule to a second computer includes the computer uploading the rule to a server and the second computer receiving the rule from the server as a result of the computer and second computer having a common registration with the server.

10. The computer-implemented method of claim 1 wherein at least one of the plurality of email messages to which the rule is applied was received prior to receiving the instruction to establish the rule.

11. An apparatus comprising:
a processing device, wherein the processing device is configured to execute instructions that cause the processing device to:
present a user interface image including an email received from a first email address and a rule-creation interface object displayed with the first email;
receive an instruction to establish a rule to take an action on each email message received from a first email address, wherein receiving the instruction includes receiving a single user input indicating that the user has selected the rule-creation interface object;
determine that the first email address is associated with contact data;
determine that the contact data is associated with a sender name and a second email address;
apply the rule to take the action on each of a plurality of email messages, the plurality of email messages including at least one email message received from the first email address and at least one email message received from the second email address, wherein applying the rule to an email message includes adding the email message to a listing of email messages sent from the sender name; and
present, at a user interface, a user interface control that incorporates the sender name, the user interface control being operable to instruct the computer to present the listing of email messages sent from the sender name.

12. The apparatus of claim 11, wherein the second email address was associated with the contact data prior to receiving the instruction to establish the rule.

13. The apparatus of claim 11, wherein the processing device is further configured to execute instructions that further cause the processing device to:
receive an instruction to edit the contact data to add the second email address to the contact data or to replace the first email address with the second email address, wherein receiving the instruction to edit the contact data causes the processing device to automatically apply the rule to each email message received from the second email address.

14. The apparatus of claim 11, wherein applying the rule further includes sorting email messages received from the first email address into a mailbox other than a primary mailbox.

15. The apparatus of claim 11, wherein applying the rule further includes generating a notification of receipt of a new email message from the first email address or the second email address, the new email message being received subsequently to establishing the rule, and wherein generation of a notification of the receipt of an email message occurs for only a subset of all email messages received by the computer.

16. The apparatus of claim 11, wherein the processing device is further configured to execute instructions that further cause the processing device to:
transmit the rule to a second computer, the second computer to apply the rule to each email message received from the second email address.

17. A non-transitory machine-readable storage medium storing instructions that, when executed, cause a processing device to perform a method comprising:
presenting, by a computer, a user interface image including an email received from a first email address and a rule-creation interface object displayed with the first email;
receiving, by the computer, an instruction to establish a rule to take an action on each email message received from a first email address, wherein receiving the instruction includes receiving a single user input indicating that the user has selected the rule-creation interface object;
determining, by the computer, that the first email address is associated with contact data;
determining, by the computer, that the contact data is associated with a sender name and a second email address;
applying, by the computer, the rule to take the action on each of a plurality of email messages, the plurality of email messages including at least one email message received from the first email address and at least one email message received from the second email address, wherein applying the rule to an email message includes adding the email message to a listing of email messages sent from the sender name; and
presenting, by the computer, a user interface control that incorporates the sender name, the user interface control being operable to instruct the computer to present the listing of email messages sent from the sender name.

18. The non-transitory machine-readable storage medium of claim 17, wherein the instructions, when executed, cause the processing device to perform a method further comprising:
receiving an instruction to edit the contact data to add the second email address to the contact data or to replace the first email address with the second email address, wherein receiving the instruction to edit the contact data causes the processing device to automatically apply the rule to each email message received from the second email address.

19. The non-transitory machine-readable storage medium of claim 17, wherein applying the rule further includes sorting email messages received from the first email address into a mailbox other than a primary mailbox.

20. The non-transitory machine-readable storage medium of claim 17, wherein applying the rule further includes generating a notification of receipt of a new email message from the first email address or the second email address, the new email message being received subsequently to establishing the rule, and wherein generation of a notification of the receipt of an email message occurs for only a subset of all email messages received by the computer.

21. The non-transitory machine-readable storage medium of claim 17, wherein the instructions, when executed, cause the processing device to perform a method further comprising:
transmitting the rule to a second computer, the second computer to apply the rule to each email message received from the second email address.

* * * * *

UNITED STATES PATENT AND TRADEMARK OFFICE
CERTIFICATE OF CORRECTION

| | | |
|---|---|---|
| PATENT NO. | : 8,886,734 B2 | Page 1 of 1 |
| APPLICATION NO. | : 13/366231 | |
| DATED | : November 11, 2014 | |
| INVENTOR(S) | : Scott Forstall et al. | |

It is certified that error appears in the above-identified patent and that said Letters Patent is hereby corrected as shown below:

On the Title Page:

Item (75) Inventors: please delete "Philip" and insert --Phillip--

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO.         : 8,886,734 B2
APPLICATION NO.    : 13/366231
DATED              : November 11, 2014
INVENTOR(S)        : Scott Forstall et al.

Page 1 of 1

It is certified that error appears in the above-identified patent and that said Letters Patent is hereby corrected as shown below:

In the claims,

Column 10, Line 10, Claim 1: delete "from a" and insert --from the--.

Column 11, Line 16, Claim 11: delete "from a" and insert --from the--.

Column 12, Line 11, Claim 17: delete "from a" and insert --from the--.

Signed and Sealed this
Twelfth Day of January, 2016

Michelle K. Lee
*Director of the United States Patent and Trademark Office*